United States Patent

Byker et al.

[11] Patent Number: 5,770,114
[45] Date of Patent: Jun. 23, 1998

[54] UV STABILIZED COMPOSITIONS WITH IMPROVED SOLUBILITY

[75] Inventors: Harlan J. Byker; Ramanujan Srinivasa, both of Holland, Mich.

[73] Assignee: Gentex Corporation, Zeeland, Mich.

[21] Appl. No.: 906,750

[22] Filed: Aug. 6, 1997

[51] Int. Cl.$^6$ ............................... G02F 1/00; G02F 1/15; F21V 9/04
[52] U.S. Cl. .......................... 252/583; 252/589; 359/265; 359/275
[58] Field of Search .................... 252/583, 586, 252/589; 359/265, 272, 275

[56] References Cited

U.S. PATENT DOCUMENTS

| 3,766,205 | 10/1973 | Heller et al. | 252/589 |
| 5,140,455 | 8/1992 | Vararaprasad et al. | 359/275 |
| 5,151,816 | 9/1992 | Varaprasad et al. | 359/275 |
| 5,239,406 | 8/1993 | Lynam | 359/275 |

FOREIGN PATENT DOCUMENTS

| 752612 | 8/1997 | European Pat. Off. . |
| WO96/03475 | 2/1996 | WIPO . |

*Primary Examiner*—Philip Tucker
*Attorney, Agent, or Firm*—Brian J. Rees

[57] ABSTRACT

The present invention concerns compositions, which comprise an aprotic polar solvent, at least one electrochromic compound, and a compound of the formula I

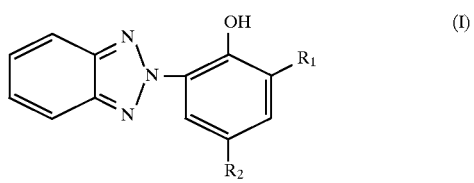

wherein $R_1$ is, for example, tert-butyl, and $R_2$ is, for example, —$CH_2$—$CH_2$—COO—$R_7$—, where $R_7$ is n-butyl or n-pentyl. Among embodiments of the invention are compositions used as media of variable transmittance in electrochromic devices, especially single-compartment, self-erasing, solution-phase electrochromic devices. The compounds of Formula I have increased solubility in aprotic polar solvents used in electrochromic devices and are effective in stabilizing compositions, which comprise at least one electrochromic compound and are useful as media of variable transmittance in electrochromic devices, against degradation due to exposure to UV-radiation. The compounds of Formula I further significantly assist in controlling the gel formation time of cross-linked polymer matrices, which comprise at least one electrochromic compound and are useful as media of variable transmittance in electrochromic devices.

30 Claims, 3 Drawing Sheets

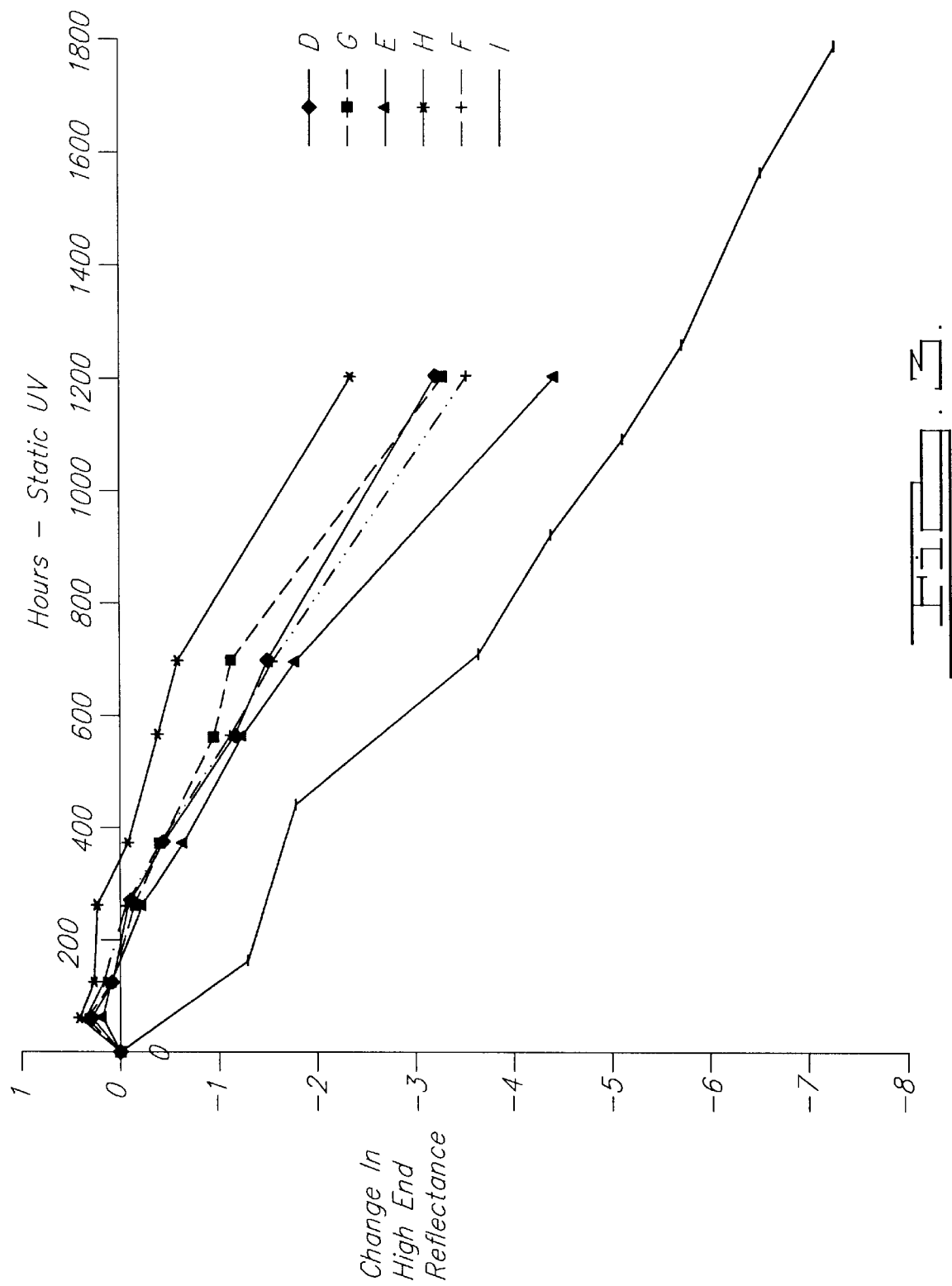

UV STABILIZED COMPOSITIONS WITH IMPROVED SOLUBILITY

BACKGROUND OF THE INVENTION

The present invention relates to improved compositions, which are stabilized against degradation during exposure to ultraviolet light, and, more particularly, to the use of such compositions as media of variable transmittance in electrochromic devices.

A major problem which limits the usefulness and useful lifetime of materials exposed to ultraviolet (UV) radiation is degradation associated with such exposure. This degradation results from decomposition and other chemical reactions of the materials initiated by absorption of photons of ultraviolet light. Materials exposed to sunlight are especially susceptible to degradation due to UV-exposure, because a significant component of sunlight is UV-radiation. Among such materials are the electrochromic media of electrochromic devices.

In U.S. Pat. No. 4,902,108, entitled "Single-Compartment, Self-Erasing, Solution-Phase Electrochromic Devices Solutions for Use Therein, and Uses Thereof", issued Feb. 20, 1990 to H. J. Byker, which is incorporated herein in its entirety by reference, solutions of electrochromic compounds are described. These solutions are useful as the media of variable transmittance in electrochromic devices. The devices, in turn, are useful as the variable transmittance components in variable transmission light filters, such as windows, and variable reflectance mirrors, such as anti-glare rearview mirrors in automobiles. Components of the solutions of electrochromic compounds described in the aforementioned patent, especially the electrochromic compounds themselves, readily absorb UV photons and, as a consequence, may undergo degradative reactions upon exposure to UV light. Thus, windows and rearview mirrors, wherein such solutions are employed to provide variable transmittance or reflectance, have useful lifetimes significantly limited in environments, such as on the exterior and certain places on the interior of buildings, or on the exterior and certain places on the interior of automobiles, where they are exposed for extended periods of time to ultraviolet light, as from the sun.

There has existed a need, then, to stabilize materials, which comprise UV-radiation-absorbing compounds, against degradation caused by exposure to UV-light. Many ultraviolet absorbers or stabilizer agents, which are compounds which provide such stabilization, when combined with materials susceptible to UV-degradation, are known in the art. Ultraviolet absorbers or stabilizer agents absorb ultraviolet radiation competitively with other compounds in a stabilized composition or are capable, without decomposition of the stabilizer itself, of dissipating the energy acquired upon absorption of a UV-photon by the materials being stabilized. Such agents must also satisfy a number of other requirements, depending on properties of the compositions to be stabilized. For example, the agents must be sufficiently soluble in such a composition and must not interact with other components in the composition in a way that interferes with using the composition for its intended purpose. Thus, an ultraviolet stabilizer agent for use in a solution employed as a medium of variable transmittance to visible light, in an electrochromic device must not interact with the electrochromic compounds or other components of the medium in a way such that they cease to function effectively in the medium and it must not compete with the electrochromic compounds for oxidation or reduction at the electrodes of an electrochromic device.

Among ultraviolet stabilizer agents, known to stabilize plastics, are the compound ethyl-2-cyano-3,3-diphenyl acrylate, sold by BASF (Parsippany, N.J.) under the trademark Uvinul N-35 and by Aceto Corporation (Flushing, N.Y., USA) under the trademark Viosorb 910; the compound (2-ethylhexyl)-2-cyano-3,3-diphenyl acrylate, sold by BASF under the trademark Uvinul N-539; the compound 2-(2'-hydroxy-4'-methylphenyl)benzotriazole, sold by Ciba-Geigy Corp. under the trademark Tinuvin P; the compound 2-hydroxy-4-methoxybenzophenone, sold by American Cyanamid under the trademark Cyasorb UV 9; and the compound 2-ethyl-2'-ethoxyoxalanilide, sold by Sandoz Color & Chemicals under the trademark Sanduvor VSU.

In U.S. Pat. No. 4,073,570, entitled Electrochromic Display Device", D. A. Korinek teaches that photodegradation may be reduced by the use of UV absorbent materials, either as a component of the electrochromic medium or as a component of the housing.

Tinuvin P has been found to be effective in stabilizing electrochromic devices against degradation from UV radiation. However, it is not soluble enough in aprotic solvents, e.g., propylene carbonate, to provide suitable protection for electrochromic devices for very long periods of time.

In U.S. Pat. No. 5,340,503, entitled "High Performance Electrochemichromic Solutions and Devices Thereof", D. V. Varaprasad et al. teach the use of certain solvents which self-screen the electrochromic solutes dissolved therein from the detrimental effects of UV radiation impinging thereon. Varaprasad et al. further teach that the combination of UV stabilizers, which are not very soluble in the solvent and therefore outnumber other solute species by only about 10 to 1 (and usually less), and the solvent, which outnumbers solute by about 350 to 1, provides improved protection from UV radiation.

In U.S. Pat. No. 5,355,245, entitled "Ultraviolet Protected Electrochemichromic Rearview Mirror", N. R. Lynam teaches that UV radiation stabilizers, such as CYASORB 24™, UVINUL D-50™, or TINUVIN 327™, may be added to enhance the stability of an electrochemichromic solution. However, since these materials impart a yellow color to the solutions, especially when added in higher concentrations where they are most effective in protecting UV vulnerable materials (approximately 0.2M), a specialized blue glass is used in the device to cancel the yellow color and obtain a more neutral colored device, albeit with lower transmission (or reflectivity).

It is desirable to provide improved stabilization against degradation upon exposure to UV-radiation of an electrochromic medium, such as is described in U.S. Pat. No. 4,902,108 or U.S. patent application Ser. No. 08/616,967, entitled "IMPROVED ELECTROCHROMIC LAYER AND DEVICES COMPRISING SAME", and its corresponding International Application No. PCT/US97/04069, filed on Mar. 14, 1997, with a UV stabilizer that has improved solubility in the aprotic polar solvents used in electrochromic devices and which does not adversely affect the color of the electrochromic medium.

OBJECTS OF THE INVENTION

Accordingly, a primary object of the present invention is to provide stabilization against degradation upon exposure to UV-radiation of electrochromic media with a UV stabilizer that does not adversely affect the color of the electrochromic media and has improved solubility in the aprotic polar solvents used in electrochromic devices.

SUMMARY OF THE INVENTION

The above and other objects, which will become apparent from the specification as a whole, including the drawings, are accomplished in accordance with the present invention by providing UV stabilizers of the formula

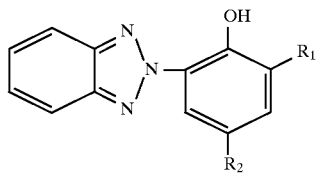

(I)

in which $R_1$ is, for example, tert-butyl and $R_2$ is, for example, —$CH_2$—$CH_2$—COO—$R_7$, where $R_7$ is n-butyl or n-pentyl, as a part of an electrochromic medium for an electrochromic device. The improved electrochromic media of the invention, which comprise at least one electrochromic compound, are prepared simply by combining the at least one electrochromic compound with an aprotic polar solvent and the compounds of Formula I, and which are suitable for a medium of variable transmittance in an electrochromic device. The compounds of Formula I have increased solubility in aprotic polar solvents used in electrochromic devices and are much more effective in stabilizing compositions, which comprise at least one electrochromic compound and are useful as media of variable transmittance in electrochromic devices, against degradation due to exposure to UV-radiation than compounds such as many other 2-(2'-hydroxy 5'-methylphenyl)benzotriazoles (e.g., Tinuvin P); 2-hydroxybenzophenones (e.g., Cyasorb UV 9); oxalanilides (e.g., Sanduvor VSU); esters of 2-cyano-3,3-diphenyl acrylic acid (e.g., Viosorb 910) and other classes of stabilizers taught in the prior art to stabilize plastics against exposure to UV-radiation. The invention substantially eliminates the problem of susceptibility to degradation upon exposure to UV-radiation, and particularly such radiation from sunlight, of media of variable transmittance in electrochromic devices, such as those taught in U.S. Pat. No. 4,902,108.

Further, it has been found that the compounds of Formula I significantly help in controlling the gel formation time of cross-linked polymer matrices, such as those taught in U.S. patent application Ser. No. 08/616,967, to W. Tonar et al., and International Application No. PCT/US97/04069, filed on Mar. 14, 1997. By controlling the gel formation time, the improved UV stabilizers significantly simplify the manufacture of electrochromic devices.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings, in which:

FIG. 3 shows several curves representing the relative change in reflectance values as a finction of exposure time to static UV radiation for electrochromic mirrors incorporating various UV stabilizers.

DETAILED DESCRIPTION

Figure 1:
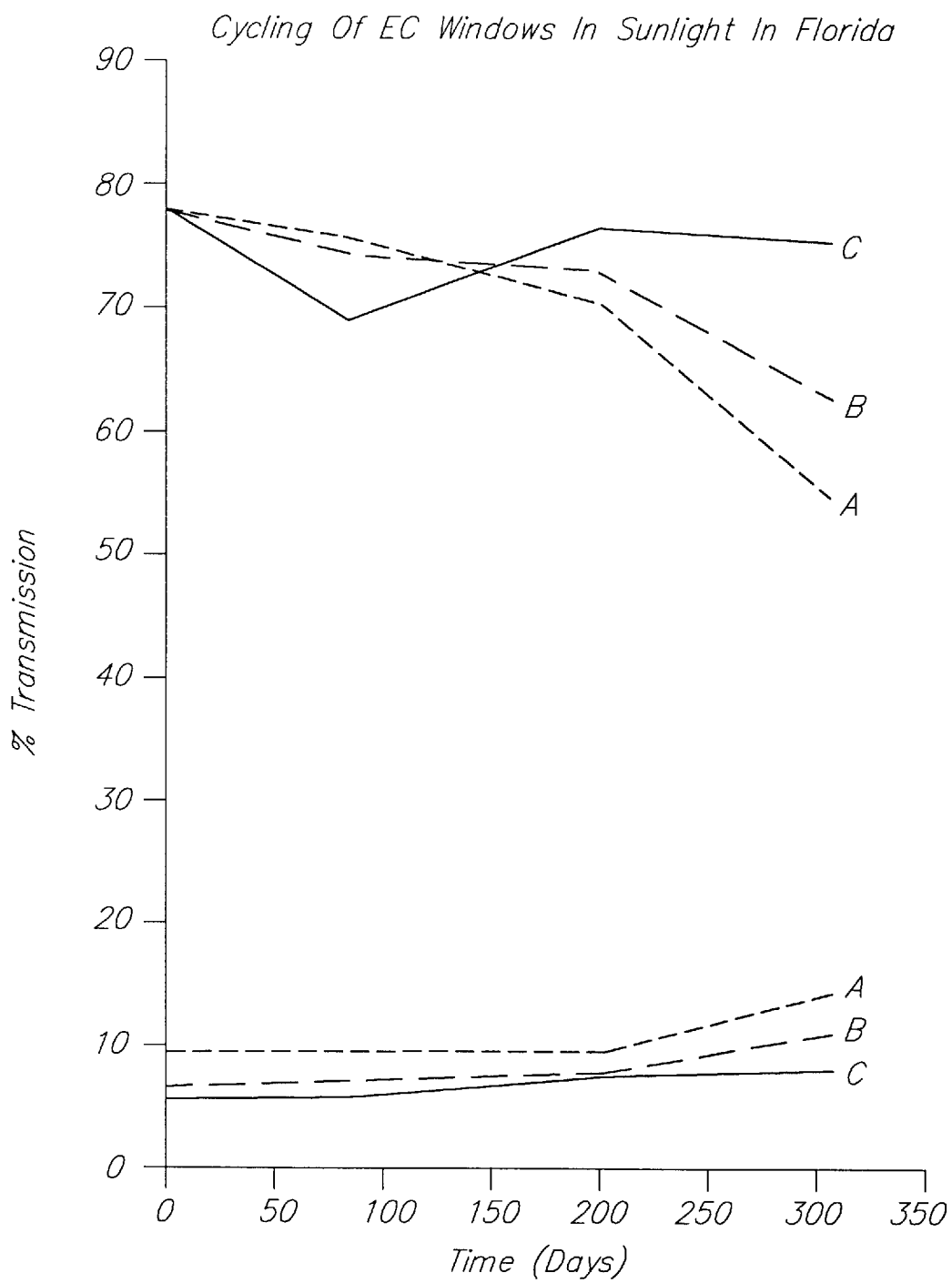
FIG. 1 shows several curves representing the high end and low end visible light transmission for electrochromic windows as a finction of exposure time to sunlight.

The present invention provides a composition which comprises (a) an aprotic polar solvent, (b) at least one electrochromic compound, and (c) a compound of Formula I

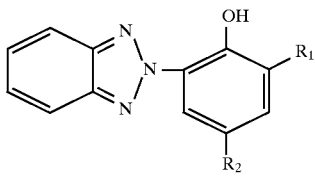

(I)

wherein $R_1$ is H, a straight or branched alkyl group containing 1 to 18 carbons, or $R_3$—COO—$R_4$, where $R_3$ is a single bond or, is a straight or branched alkyl group containing 1–6 carbons and $R_4$ is a straight or branched alkyl group containing 1–18 carbons. If $R_1$ is H or a straight or branched alkyl group containing 1 to 18 carbons, then $R_2$ is $R_3$–COO—$R_4$. If, however, $R_1$ is $R_3$—COO—$R_4$, then $R_2$ is H, a straight or branched alkyl group containing 1 to 18 carbons, or $R_5$—COO—$R_6$, where $R_5$ is a single bond or, is a straight or branched alkyl group containing, 1 to 6 carbons, and $R_6$ is a straight or branched alkyl group containing 1–18 carbons. Preferrably, $R_1$ is tert-butyl and $R_2$ is $CH_2$—$CH_2$—COO—$R_7$, where $R_7$ is n-butyl or n-pentyl.

Among the aprotic polar solvents suitable for the invention are those, other than water, known in the art of solution-phase electrochromic devices to be suitable for the dissolution of one or both of an anodic electrochromic compound and a cathodic electrochromic compound in order to provide a medium of variable transmittance (to visible light) of an electrochromic device. Such solvents include, among others, N,N-dimethylformamide, dimethyl sulfoxide, acetonitrile glutaronitrile, 2-methyl glutaronitrile and cyclic esters. Suitable cyclic ester solvents include, among others, propylene carbonate, gamma-butyrolactone, gamma-valerolactone, and any homogeneous mixture that is liquid at room temperature of any two or more of said cyclic ester solvents or any one or more of said cyclic ester solvents with ethylene carbonate. Most preferred is neat propylene carbonate.

The compounds of Formula I are known. For example, U.S. Pat. No. 4,853,471, entitled 2-(2-HYDROXYPHENYL)-BENZTRIAZOLES, THEIR USE AS UV-ABSORBERS AND THEIR PREPARATION" teaches that the compounds of Formula I are useful as UV-absorbers for stabilizing and improving lacquers and photographic material.

Compositions of the invention are media of variable transmittance in electrochromic devices and which, as such, comprise one or both of an anodic electrochromic compound and a cathodic electrochromic compound and may comprise other components as well, as understood in the electrochromic device art. Generally speaking, an anodic electrochromic compound is one which, upon electrochemical oxidation, increases its absorbance at at least one wavelength in the visible spectrum, and a cathodic electrochromic compound is one which, upon electrochemical reduction, increases its absorbance at at least one wavelength in the visible range. The preferred compositions of the invention are those which are media of reversibly variable transmittance in single-compartment, solution-phase, self-erasing electrochromic devices, as described in U.S. Pat. No. 4,902, 108. Co-pending U.S. patent application Ser. No. 08/832, 596, entitled "An Improved Electrochromic Medium Capable of Producing A Pre-selected Color", describes an improved electrochromic medium comprising at least three electroactive materials having absorption spectra when activated that add together such that the color of the electrochromic medium can be pre-selected by individually choosing the concentrations of the at least three electroactive materials. In addition, above-referenced U.S. patent application Ser. No. 08/616,967, and its corresponding International Application teach and claim an improved electrochromic layer which comprises a solvent, a cross-linked polymeric matrix and at least one electrochromic compound in solution is the solvent and interspersed in the polymer matrix. The disclosures of these patents and patent applications, including the references contained therein, are hereby incorporated herein in their entirety by reference.

Compositions of the invention, which are media of reversibly variable transmittance in electrochromic devices, may also comprise an inert, current carrying electrolyte, particularly if there is no electrochromic compound which is ionic in its equilibrium state in an electrochromic device with no potential difference between the cathode and anode. Such inert, current-carrying electrolytes are well known in the art. Examples are provided in U.S. Pat. No. 4,902,108.

Compositions of the invention, which are media of reversibly variable transmittance in solution-phase electrochromic devices, may also include a polymeric thickener. In this regard, reference is also made to U.S. Pat. No. 4,902,108, and U.S. patent application Ser. No. 08/834,783, entitled "An Electrochromic Mirror with Two Thin Glass Elements and a Gelled Electrochromic Medium", both of which are incorporated herein in their entirety (including the references contained therein) by reference. While many such thickeners are known, polyethylene oxide and "PMMA" (polymethylmethacrylate), and certain PMMA copolymers disclosed in U.S. patent application Ser. No. 08/834,783 are preferred.

In the more preferred compositions according to the invention, the compounds of Formula I have very good solubility in cyclic esters, especially propylene carbonate. Further, the compounds of Formula I are solid at room temperature so that they can be purified by recrystallization. It should be noted, however, that neither crystals or a solid is obtained for $R_6$ equaling n-hexyl at room temperature. The compound of Formula I can be present at room temperature at between about 10 mM to about 250 mM, more preferably about at a concentration at between about 30 mM to about 150 mM, in propylene carbonate as solvent. Further, in these more preferred compositions, PMMA thickener at between about 2% (w/w) and about 5% (w/w)(relative to the weight of solvent), 5,10-dihydro-5,10-dimethyl-phenazine at between about 1 mM and about 100 mM (more preferably between about 3 mM and about 30 mM)(in the solvent at room temperature), and 1,1'-bis(3-phenyl(n-propyl))-4,4'-dipyridinium bis(tetrafluoroborate) at between about 1 mM and about 100 mM (more preferably between about 3 mM and about 40 mM)(in the solvent at room temperature), will also be present.

Electrochromic devices, which comprise as the medium of reversibly variable transmittance a composition according to the invention, are also encompassed by the present invention. Preferred among these are solution-phase, single-compartment, self-erasing devices.

Thus, in another of its embodiments, the invention entails, in a single-compartment, self-erasing, solution-phase electrochromic device which comprises, as the medium of reversibly variable transmittance to light, an aprotic polar solvent, at least one electrochromic material, and a compound of Formula I. The devices of the invention can be employed as the variable transmittance components of variable transmission light filters, such as windows, or variable reflectance mirrors, including anti-glare, outside and inside, rearview mirrors for motor vehicles. Construction of single-compartment, self-erasing, solution-phase electrochromic devices according to the invention are described in U.S. Pat. No. 4,902,108. Alternatively, the device may be constructed in accordance with the teaching in above-referenced and co-pending U.S. patent application Ser. No. 08/834,783.

The stability of an electrochromic medium against degradation due to exposure to UV-radiation is typically measured by monitoring the change in transmittance or absorbance of the medium (or, alternatively, the reflectance of a mirror containing the medium of variable transmittance) in its zero-potential equilibrium state or its fully darkened state. The stability is measured as a function of time during exposure to light from a mercury or xenon arc lamp at an elevated temperature in a controlled environment. Measurement of stability is described in somewhat more detail in the examples below.

In another of its embodiments, the present invention relates to the relationship between the UV absorbers or stabilizers of Formula I and polymer matrices used to impart rigidity to the electrochromic media of electrochromic devices. The improved cross-linked polymer matrix used in the present invention is disclosed in co-pending U.S. patent application Ser. No. 08/616,967 and its International Patent Application No. PCT/US97/04069.

Generally, the polymer matrix results from crosslinking polymer chains, where the polymer chains have been formed by the polymerization of at least one monomer that has a crosslinkable group. Preferred among the monomers is methyl methacrylate; methyl acrylate; 2-isocyanatoethyl methacrylate; 2-isocyanatoethyl acrylate; 2-hydroxyethyl methacrylate; 2-hydroxyethyl acrylate; 3-hydroxypropyl methacrylate; glycidyl methacrylate; 4-vinylphenol; acetoacetoxy methacrylate and acetoacetoxy acrylate.

It should be understood that more than one monomer may be polymerized together. Generally, any of the combinations of the monomers shown may be combined into one or more polymers (i.e., a polymer, a copolymer, terpolymer, etc.) in the polymerization process as long as one of the monomers contains a crosslinkable group. For example, one monomer may be polymerized to give a homogeneous polymer material such as poly(2-hydroxyethyl methacrylate), or poly(2-isocyanatoethyl methacrylate), or the like. However, it is generally preferred that a species with a crosslinking reactive component (e.g., hydroxyl, acetoacetyl, isocyanate, thiol, etc.) be combined with another species having the same or similar crosslinking reactive component and/or no crosslinking reactive component (e.g., methyl methacrylate, methyl acrylate, etc.). If a copolymer is produced, the ratio of the monomers without and with the crosslining components may range from about 200:1 to about 1:200. An example of these copolymers include hydroxyethyl methacrylate (HEMA) combined with methyl methacrylate (MMA) to form a copolymer. The ratio of HEMA to MMA may range from about 1:3 to about 1:50 with the preferred ratio being about 1:10. The preferred crosslinker for any of the polymer chains having a hydroxyl (or any other reactive group having an active hydrogen, such as thiol, hydroxyl, acetoacetyl, urea, melamine, urethane, etc.) is an isocyanate, isothiocyanate, and the like having a functionality greater than one. Alternatively, 2-isocyanatoethyl methacrylate (IEMA) may be combined with MMA in the ratio of about 1:3 to about 1:50 with the preferred ratio of about 1:10. Crosslinking of any of the polymer chains containing an isocyanate can occur with any di- or poly-functional compound containing a reactive hydrogen, such as hydroxyl, thiol, acetoacetyl, urea, melamine, urethanes, with hydroxyl being presently preferred. These must have a functionality greater than one and may be aliphatic or aromatic compounds or, preferably, may be 4,4'-isopropylidenediphenol; 4-4'(1-4 phenylenediisopropylidene) bisphenol; 4-4'(1-3 phenylenediisopropylidene) bisphenol; 4,4'-sulfonyldiphenol; 4',5,7-trihydroxyflavanone; 4,4'-(1-phenylethylidene) bisphenol; 4,4'-cyclohexylidene bisphenol; 4,4'-(-9-fluorenylidene)diphenol; 4,4'-(hexafluroisopropylidene) diphenol; 2,2'-bis(4-hydroxy-3-methylphenyl) propane; 4,4'-isopropylidene bis(2,6-dimethyl phenyl); or 1,3-dihydroxy benzene. Although the above description relates to copolymers, it will be understood by those skilled in the art that more complex structures (terpolymers, etc.) may be made using the same teachings.

Finally, two copolymers may be combined such that they crosslink with one another. For example HEMA/MMA may be combined with IEMA/MMA and the hydroxyl groups of HEMA will react with the isocyanate groups of IEMA to form an open polymeric structure. It should be understood that the rates of crosslinking for any of the polymers described herein can be controlled by proper selection of the reactive crosslinking species employed. For example, reaction rates can be increased by using an aromatic isocyanate or an aromatic alcohol or both. Reaction rates can be decreased, for example, by using sterically hindered isocyanates or sterically hindered alcohols or both.

It should be noted that the rigidity of the free standing gel can be altered by changing the polymer molecular weight, the weight percent of the polymer and the crosslink density of the polymer matrix. The gel rigidity generally increases with increasing polymer concentration (weight percent), increasing crosslink density and to some extent with increasing molecular weight.

Surprisingly, the inclusion of the UV-stabilizers of Formula I in the above-discussed gel systems have a pronounced affect upon gel formation times. As stated above, the presently preferred gels are those based on polymer chains incorporating isocyanate functionalities crosslinked with multifunctional alcohols. We have found that the gel formation times are increased when the UV-stabilizers are incorporated into the electrochromic system prior to gellation. Without wanting to be limited to any specific theory, it is presently believed that the hydroxyl functionality in the compounds of Formula I delay the crosslinking between the isocyanate-containing polymer chains and the hydroxy-containing crosslinkers by temporarily tying up the isocyanate functionalities. Since the UV-stabilizers of Formula I only have one hydroxyl functionality, they tend to "cap" the isocyanates and impede further crosslinking. However, over time, e.g., 0.5 to 50 hours, the bond between the hydroxyl functionality on the UV-stabilizers reverts to its original form and the reformed isocyanate is free to react with the multifunctional hydroxyl crosslinker. Thus, crosslinking is not stopped, only slowed down or delayed slightly. This provides significant advantages in the electrochromic art in that the ultimate crosslink density is high but the "pot life" for filling the device is relatively long. In the present invention "pot life" means the period during which the gel matrix has not formed to any significant extent and the electrochromic solution as herein described can be introduced into electrochromic devices as a generally free-flowing solution.

Indeed, it has been experimentally shown that in systems comprised of an isocyanate functional copolymer, such as a 1:10 or 1:20 weight ratio of IEMA/MMA, crosslinked with a dihydroxy functional chemical, such as Bisphenol A, the inclusion of different UV absorbers has altered the time required for the gel matrix to form. Using 1:10 IEMA/MMA copolymer crosslinked with Bisphenol A without UV absorber as a reference point, it has been observed that certain UV absorbers accelerate the formation of a gel matrix while others decelerate the formation of the gel matrix.

This was evidenced by recording the time required for a gel to form from the initiation of the reaction (mixing of two solutions, one containing the copolymer(s) and the other containing the Bisphenol A, with or without various UV absorbers). The mixtures were observed periodically to determine the time required for the mixture to pass through the following stages of gellation: (1) initial mixing; (2) formation of a free flowing, albeit "snotty" mixture; (3) formation of a "releasing" gel, i.e., one that is no longer free-flowing, but does not adhere to glass; and (4) formation of a "shifting, non-releasing" gel, i.e., one that, rather than being quite rigid, still moves or shifts upon inversion, but will not release or break its adherence to the surface with which it is in contact.

The time to develop a shifting, non-releasing gel using a 1:10 IEMA/MMA copolymer crosslinked with Bisphenol A incorporating no UV stabilizer was approximately ½ an hour, and was approximately ¾ of an hour incorporating 50 mM Tinuvin P as a stabilizer, and approximately 2 hours incorporating 50 mM of a t-butyl butyl ester stabilizer. The time to develop the shifting, non-releasing gel was approximately 2–3 hours using 50 mM of a t-butyl pentyl ester UV stabilizer, the time was only 11.5 minutes using 50 mM of a 2-hydroxy-4-n-octoxy benzophenone stabilizer, and when using 50 mM 2,4-hydroxy benzophenone as a UV absorber no gellation took place even after 6 months.

While the above examples compare the affect of UV stabilizers at the same concentration, it is also advantageous to utilize the increased solubility of the UV stabilizers of the present invention to control gel formation. Thus, by selecting the proper UV absorber and controlling its concentration, one can easily vary the gellation time of the above-discussed thermally cured cross-linked polymer matrices. This offers marked advantages in producing viable gel matrices for use in electrochromic devices.

The following illustrative examples are not intended to limit the scope of this invention but to illustrate its application and use:

EXAMPLE I

Electrochromic windows were each prepared from two sheets of TEC 15 glass (available from Libbey-Owens-Ford of Toledo, Ohio). Each sheet of TEC 15 glass was 11 inches by 14 inches and the transparent conductive layers faced each other and were separated by an 890 micron thick spacing. An epoxy seal was provided near the perimeter and nearly all the way around the perimeter of the two sheets of glass, for each window, to maintain the spacing and provide a chamber to be filled with electrochromic medium.

The chamber of each window was filled with a solution of 6 millimolar 1,1'-dimethyl-4,4'-dipyridinium bis (tetrafluoroborate) and 6 millimolar 5,10-dimethyl-5,10-dihydrophenazine, dissolved in a 5 weight percent polymethylmethacrylate solution in propylene carbonate.

In addition to the solution constituents given above the solutions in the chambers contained the following UV stabilizer:

| Window | Concentration | UV Stabilizer |
|---|---|---|
| A | 30 millimolar | 2-(2'-hydroxy-5'-methylphenyl) benzotriazole |
| B | 100 millimolar | 2-hydroxy-4-methoxybenzophenone |
| C | 96 millimolar | 2(2'-hydroxy-3'-tert.-butyl-5'-n-butyl propionate phenyl) benzotriazole |

Each window was plugged and sealed with a UV cured end plug material. Electrical contact to the transparent electrodes was provided by a strip of silver paint around the perimeter of each sheet of glass.

The windows were colored at 1.0 volt applied potential from 7:00 a.m. until 7:00 p.m. each day and were cleared and held at short circuit from 7:00 p.m. until 7:00 a.m. each day. The windows were oriented nearly horizontal (raised 5 degrees to the south) and exposed to sunlight during the aforementioned cycling on a rooftop near Tampa, Fla. for 307 days. The high end and low end visible light transmission for each window as a function of exposure time is shown in FIG. 1. As shown in FIG. 1, Window C which contained a UV stabilizer of the present invention outperformed Windows A and B for both high end and low end visible light transmission at the end of the 307-day test.

EXAMPLE 2

Electrochromic mirrors (D through H) consisting of a sheet of TEC 15 glass (available from Libbey-Owens-Ford of Toledo, Ohio), and a reflective back plate coated with the a layer of chrome and a layer of rhodium were filled with a solution such that a gel matrix was formed inside the device. Electrochromic mirror I differed in that the front and rear glass elements were thin (1.1 mm) and the front glass element was coated with indium-doped tin oxide.

The gel components and electrochromic chemicals were introduced in the following manner. Two separate solutions were prepared so that the first solution (Solution A) contained one electrochromic compound, namely 1,1'-bis(3-phenyl(n-propyl))-4,4'-dipyridinium bis(tetrafluoroborate), a copolymer comprised of a 1:10 ratio of isocyanatoethyl-methacrylate and methylmethacrylate, and 50% of the amount of the particular UV absorber bring studied.

The second solution (Solution B) contained an electrochromic compound, namely 5,10-dimethyl-5,10-dihydrophenazine, a dihydroxy crosslinker to react with the copolymer, namely Bisphenol A, and the remaining 50% of the particular UV absorber under study.

Solutions A and B were mixed together and introduced into the electrochromic device. After approximately 2 hours, the copolymer and crosslinker reacted with each other sufficiently to form a freestanding gel.

Solutions A and B were prepared and mixed in such a way that the final gel contained 34 mM 1,1'-bis(3-phenyl(n-propyl))-4,4'-dipyridinium bis(tetrafluoroborate), 28 mM 5,10-dimethyl-5,10-dihydrophenazine, approximately 8.5% by weight polymer matrix content consisting of Bisphenol A and 1:10 1 IEMA/MMA copolymer at a crosslink ratio of 1.2:1 based on equivalents, and 50 or 100 mM of the UV absorber under study.

The following UV stabilizers were studied:

| Mirror | Concentration | UV Stabilizer |
|---|---|---|
| D | 50 millimolar | 2-(2'-hydroxy-5'-methylphenyl) benzotriazole |
| E | 50 millimolar | 2(2'-hydroxy-3'-tert.-butyl-5'-n-butyl propionate phenyl) benzotriazole |
| F | 100 millimolar | 2(2'-hydroxy-3'-tert.-butyl-5'-n-butyl propionate phenyl) benzotriazole |
| G | 50 millimolar | 2(2'-hydroxy-3'-tert.-butyl-5'-n-pentyl propionate phenyl) benzotriazole |
| H | 100 millimolar | 2(2'-hydroxy-3'-tert.-butyl-5'-n-pentyl propionate phenyl) benzotriazole |
| I | 20 millimolar | 2-(2'-hydroxy-5'-methylphenyl) benzotriazole |

The effectiveness of the above UV absorbers were tested by exposing the electrochromic mirrors to UV radiation. This was done in an Atlas CI-65 Weatherometer under continuous light exposure, an irradiance of 0.55 W/m$^2$ at 340 nm, an ambient temperature of 50 degrees Celsius, and a black panel temperature of 70 degrees Celsius. The color coordinates and reflectance of the parts were measured initially and periodically throughout testing using an X-Rite SP68 spectrophotometer. These parts were not electrochemically cycled during the testing procedure.

In discussing colors it is useful to refer to the Commission Internationale de l'Eclairage's (CIE) 1976 CIELAB Chromaticity Diagram (commonly referred to as the L*a*b* chart). The technology of color is relatively complex, but a fairly comprehensive discussion is given by F. W. Billmeyer and M. Saltzman in *Principles of Color Technology*, 2$^{nd}$ Edition, J. Wiley and Sons Inc. (1981), and the present disclosure, as it relates to color technology and terminology, generally follows that discussion. On the L*a*b* chart, L* defines lightness, a* denotes the red/green value and b* denotes the yellow/blue value. Each of the electrochromic media has an absorption spectra at each particular voltage that may be converted to a three number designation, their L*a*b* values, however, for the present discussion, the b* and reflectance values (at short circuit) are most relevant because electrochromic media tend to yellow over time with exposure to UV radiation.

Figure 2:
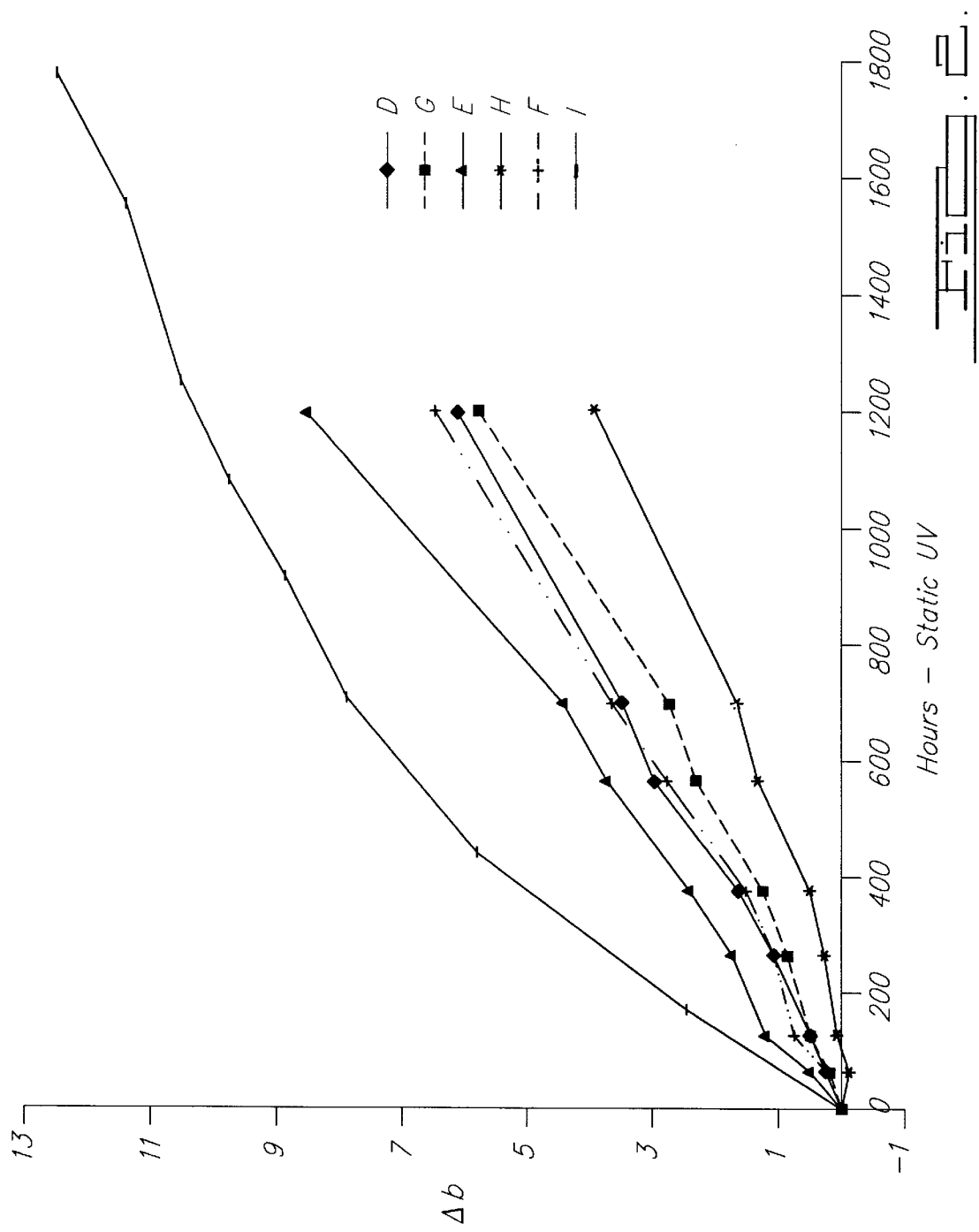
FIG. 2 shows several curves representing the relative change in b* values as a function of exposure time to static UV radiation for electrochromic mirrors incorporating various UV stabilizers.

The change in the b* and reflectance values for each mirror as a function of exposure time are shown in FIGS. 2 and 3, respectively. As shown in FIGS. 2 and 3, Mirror H, which contained a preferred UV stabilizer of the present invention, outperformed Mirror D for both the change in b* and reflectance values.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

What is claimed is:

1. A UV-stabilized composition which comprises (a) an aprotic polar solvent, (b) at least one electrochromic compound, and (c) a compound of the formula I

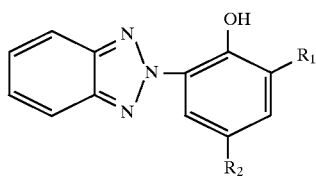

wherein $R_1$ is H, a straight or branched alkyl group containing 1 to 18 carbons, or $R_3$—COO—$R_4$, where $R_3$ is a single bond, or is a straight or branched alkylene group containing 1–6 carbons and $R_4$ is a straight or branched alkyl group containing 1–18 carbons, and if $R_1$ is H or a straight or branched alkyl group containing 1 to 18 carbons, then $R_2$ is $R_3$—COO—$R_4$, and if $R_1$ is $R_3$—COO—$R_4$, then $R_2$ is H, a straight or branched alkyl group containing 1 to 18 carbons, or $R_5$—COO—$R_6$, where $R_5$ is a single bond, or is a straight or branched alkylene group containing 1 to 6 carbons, and $R_6$ is a straight or branched alkyl group containing 1–18 carbons.

2. The UV-stabilized composition according to claim 1 wherein the solvent is a liquid at room temperature and is selected from the group consisting of propylene carbonate, gamma-butyrolactone, gamma-valerolactone, and any homogeneous mixture that is liquid at room temperature of any two or more of said solvents or any one or more of said solvents with ethylene carbonate.

3. The UV-stabilized composition according to claim 2, wherein said at least one electrochromic compound comprises an anodic and a cathodic electrochromic compound.

4. The UV-stabilized composition according to claim 3 where said anodic compound is 5,10-dihydro-5,10-dimethylphenazine and where said cathodic compound is 1,1'-bis(3-phenyl(n-propyl))-4,4'-dipyridinium bis(tetrafluoroborate).

5. The UV-stabilized composition according to claim 2 wherein, in the compound of Formula I, $R_1$ is tert-butyl and $R_2$ is $CH_2$—$CH_2$—COO—$R_7$, where $R_7$ is n-butyl or n-pentyl.

6. The UV-stabilized composition according to claim 5 which comprises additionally an anodic and a cathodic electrochromic compound.

7. The UV-stabilized composition according to claim 6 where said anodic compound is 5,10-dihydro-5,10-dimethylphenazine and where said cathodic compound is 1,1'-bis(3-phenyl(n-propyl))-4,4'-dipyridinium bis(tetrafluoroborate).

8. The UV-stabilized composition according to claim 5 wherein the concentration at room temperature in the propylene carbonate of the compound of Formula I is between about 10 mM and about 250 mM.

9. The UV-stabilized composition according to claim 8 wherein the concentration at room temperature in the propylene carbonate of the 5,10-dihydro-5,10-dimethylphenazine is between about 1 mM and about 100 mM, and the concentration at room temperature in the propylene carbonate of the 1,1'-bis(3-phenyl(n-propyl))-4,4'-dipyridinium bis(tetrafluoroborate) is between about 1 mM and about 100 mM.

10. The UV-stabilized composition according to claim 1 wherein the solvent is propylene carbonate.

11. The UV-stabilized composition according to claim 10, wherein said at least one electrochromic compound comprises an anodic and a cathodic electrochromic compound.

12. The UV-stabilized composition according to claim 11 where said anodic compound is 5,10-dihydro-5,10-dimethylphenazine and where said cathodic compound is 1,1'- bis(3-phenyl(n-propyl))-4,4'-dipyridinium bis(tetrafluoroborate).

13. The UV-stabilized composition according to claim 12 wherein the concentration at room temperature in the propylene carbonate of the 5,10-dihydro-5,10-dimethylphenazine is between about 1 mM and about 100 mM, and the concentration at room temperature in the propylene carbonate of the 1,1'-bis(3-phenyl(n-propyl))-4, 4'-dipyridinium bis(tetrafluoroborate) is between about 1 mM and about 100 mM.

14. The UV-stabilized composition according to claim 11 wherein, in the compound of Formula I, $R_1$ is tert-butyl and $R_2$ is $CH_2$—$CH_2$—COO—$R_7$, where $R_7$ is n-butyl or n-pentyl.

15. The UV-stabilized composition according to claim 10 wherein the concentration at room temperature in the propylene carbonate of the compound of Formula I is between about 10 mM and about 250 mM.

16. The UV-stabilized composition according to claim 1 wherein Formula I is at a concentration at room temperature between about 10 mM and about 250 mM in propylene carbonate, and where said composition further comprises 5,10-dihydro-5,10-dimethylphenazine at a concentration at room temperature in the propylene carbonate of between about 1 mM and about 100 mM, and 1,1'-bis(3-phenyl(n-propyl))-4,4'-dipyridinium bis(tetrafluoroborate) at a concentration at room temperature in the propylene carbonate of between about 1 mM and about 100 mM.

17. An electrochromic device comprising a UV-stabilized composition which comprises (a) an aprotic polar solvent, (b) at least one electrochromic compound, and (c) a compound of the formula I

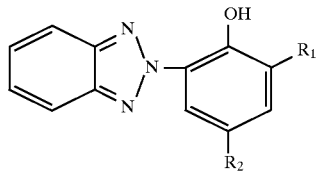

wherein $R_1$ is H, a straight or branched alkyl group containing 1 to 18 carbons, or $R_3$—COO—$R_4$, where $R_3$ is a single bond, or is a straight or branched alkylene group containing 1–6 carbons and $R_4$ is a straight or branched alkyl group containing 1–18 carbons, and if $R_1$ is H or a straight or branched alkyl group containing 1 to 18 carbons, then $R_2$ is $R_5$—COO—$R_6$, where $R_5$ is a single bond, or is a straight or branched alkylene group containing 1 to 6 carbons, and $R_6$ is a straight or branched alkyl group containing 1–18 carbons, and if $R_1$ is $R_3$—COO—$R_4$, then $R_2$ is H, a straight or branched alkyl group containing 1 to 18 carbons, or $R_5$—COO—$R_6$.

18. The electrochromic device according to claim 17 wherein the solvent is a liquid at room temperature and is selected from the group consisting of propylene carbonate, gamma-butyrolactone, gamma-valerolactone, and any homogeneous mixture that is liquid at room temperature of any two or more of said solvents or any one or more of said solvents with ethylene carbonate.

19. The electrochromic device according to claim 18, wherein said at least one electrochromic compound comprises an anodic and a cathodic electrochromic compound.

20. The electrochromic device according to claim 19 where said anodic compound is 5,10-dihydro-5,10-dimethylphenazine and where said cathodic compound is 1,1'-bis(3-phenyl(n-propyl))-4,4'-dipyridinium bis(tetrafluoroborate).

21. The electrochromic device according to claim 17 wherein, in the compound of Formula I, $R_1$ is tert-butyl and $R_2$ is $CH_2$—$CH_2$—COO—$R_7$, where $R_7$ is n-butyl or n-pentyl.

22. The electrochromic device according to claim 17 wherein said solvent is propylene carbonate and Formula I is at a concentration at room temperature between about 30 mM and about 150 mM in propylene carbonate, and where said composition further comprises 5,10-dihydro-5,10-dimethylphenazine at a concentration at room temperature in the propylene carbonate of between about 1 mM and about 100 mM, and 1,1'-bis(3-phenyl(n-propyl))-4,4'-dipyridinium bis(tetrafluoroborate) at a concentration at room temperature in the propylene carbonate of between about 1 mM and about 100 mM.

23. An electrochromic medium of reversibly variable transmittance to light which comprises:
(a) a solvent
(b) a cross-linked polymer matrix resulting from crosslinking polymer chains that are formed by polymerizing at least one monomer;
(c) at least one electrochromic compound in solution in said solvent and interspersed in said polymer matrix; and
(d) a compound of the formula I

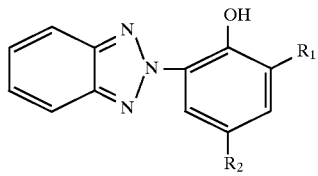

wherein $R_1$ is H, a straight or branched alkyl group containing 1 to 18 carbons, or $R_3$—COO—$R_4$, where $R_3$ is a single bond, or is a straight or branched alkylene group containing 1–6 carbons and $R_4$ is a straight or branched alkyl group containing 1–18 carbons, and if $R_1$ is H or a straight or branched alkyl group containing 1 to 18 carbons, then $R_2$ is $R_5$—COO—$R_6$, where $R_5$ is a single bond, or is a straight or branched alkylene group containing 1 to 6 carbons, and $R_6$ is a straight or branched alkyl group containing 1–18 carbons, and if $R_1$ is $R_3$—COO—$R_4$, then $R_2$ is H, a straight or branched alkyl group containing 1 to 18 carbons, or $R_5$—COO—$R_6$.

24. The electrochromic medium according to claim 23, where said at least one monomer is selected from the group consisting of: 2-isocyanatoethyl methacrylate; 2-isocyanatoethyl acrylate; vinyl ether n-butyl methyl methacrylate; tetraethylene glycol vinyl ether; glycidyl methacrylate; acetoacetoxyethyl methacrylate and acetoacetoxyethyl acrylate.

25. The electrochromic medium according to claim 24 further including a crosslinker which is selected from the group consisting of: 4,4'-isopropylidenediphenol; 4,4'-(1,4 phenylenediisopropylidene) bisphenol; 4,4'-(1,3 phenylenediisopropylidene) bisphenol; 4,4'-sulfonyldiphenol; 4',5,7-trihydroxyflavanone; 4,4'-(1-phenylethylidene) bisphenol; 4,4'-cyclohexylidene bisphenol; 4,4'-(-9-fluorenylidene)diphenol; 4,4'-(hexafluroisopropylidene) diphenol; 1,3-dihydroxy benzene; 2,2'-bis(4-hydroxy-3-methylphenyl) propane; and 4,4'-isopropylidene bis(2,6-dimethyl phenyl).

26. The electrochromic medium according to claim 23 where said polymer chains results from the polymerization of at least two distinct monomers.

27. The electrochromic medium according to claim 26 where said at least two monomers are selected from the group consisting of: methyl methacrylate; methyl acrylate; 2-isocyanatoethyl methacrylate; 2-isocyanatoethyl acrylate; vinyl ether n-butyl methyl methacrylate; tetraethylene glycol divinyl ether; glycidyl methacrylate; acetoacetoxyethyl methacrylate and acetoacetoxyethyl acrylate.

28. The electrochromic medium according to claim 27 where said at least two monomers comprise isocyanatoethyl methacrylate and methyl methacrylate in a ratio from about 1:3 to about 1:50.

29. The electrochromic medium according to claim 28 where the ratio of isocyanatoethyl methacrylate to methyl methacrylate is about 1:10.

30. The electrochromic medium according to claim 28 where said polymer chains formed from at least isocyanato methacrylate and methyl methacrylate are crosslinked by a compound having more than one functional group that contains an active hydrogen.

* * * * *